Dec. 24, 1940.  G. F. LAING  2,225,700

THERMOCOUPLE APPARATUS

Filed Dec. 20, 1937

Inventor
Gordon F. Laing
By
George H. Fisher
Attorney

Patented Dec. 24, 1940

2,225,700

UNITED STATES PATENT OFFICE 2,225,700

THERMOCOUPLE APPARATUS

Gordon F. Laing, Minneapolis, Minn., assignor to Minneapolis-Honeywell Regulator Company, Minneapolis, Minn., a corporation of Delaware Application December 20, 1937, Serial No. 180,769

9 Claims. (Cl. 250—27)

This invention relates to thermocouple apparatus and more particularly to apparatus in which the voltage generated by a thermocouple is amplified.

One of the principal drawbacks to the use of a thermocouple in temperature responsive apparatus is that the electromotive force generated by the thermocouple is extremely small. This difficulty can be overcome to some extent by the use of a thermopile but the voltage still remains relatively small and the thermopile itself introduces certain additional difficulties. If an attempt is made to connect a thermocouple to a space discharge amplifier, the difficulty is immediately encountered that the voltage of a thermocouple is so small that in order to use an amplifier having an output sufficiently large to be of practical value, it is necessary to have three or four steps of amplification. This is often prohibitive from the standpoint of cost.

It has been proposed to overcome this difficulty by connecting the thermocouple to the input circuit of a space discharge amplifier through a step-up transformer, the connection between the thermocouple and the primary of the transformer being periodically interrupted to produce a pulsating current on the primary circuit which the transformer can respond to. The difficulty with such a system is that the voltage applied to the grid circuit is inherently an alternating one. While this difficulty can be overcome by biasing the grid of the vacuum tube to a point where only the positive peaks of the alternating current are passed by the tube, or in other words by operating the tube as a class B or class C amplifier, it is often undesirable for various reasons to so operate the tube. Moreover, with this sort of an arrangement, it is impossible to detect any direction of current flow through the thermocouple. It is sometimes desirable to have apparatus controlled in accordance with the direction of a temperature change. A thermocouple can be made to respond to the direction of temperature change by making one of the junctions such that it is capable of much more quickly absorbing and giving up heat than the other junction. In this manner as the temperature rises, one junction is the hot junction and when the temperature is falling the other junction is the hot junction. With the arrangements of the prior art, it has been impossible to detect the polarity of the current flowing through the thermocouple.

An object of the present invention is to provide an arrangement for coupling a thermocouple through a step-up transformer to a device utilizing a higher voltage than that generated by the thermocouple in which an interrupter is used to simultaneously and periodically interrupt both the primary circuit and also the secondary circuit to rectify the output of the transformer.

A further object of the present invention is to provide an arrangement such as set out in the preceding object in which the thermocouple has one junction which more quickly absorbs and dissipates heat than the other and in which the arrangement is used to control apparatus which it is desired to control according to the direction of change of temperature.

A further object of the present invention is to provide an arrangement of the type set forth in the previous objects in which the output of the transformer is coupled to a space discharge amplifier.

A further object of the present invention is to provide an arrangement of the type set forth in the previous object in which means is provided to prevent a flow of current in the output circuit of the tube in the event of failure of the interrupter to reclose either circuit.

A further object of the invention is to provide an arrangement for coupling a thermocouple to a space discharge amplifier through a step-up transformer and a vibrator in the input circuit in which two thermocouples are used which are alternately connected in the circuit.

Other objects of the present invention will be apparent upon a consideration of the accompanying specification, claims, and drawing, of which—

Figure 1:
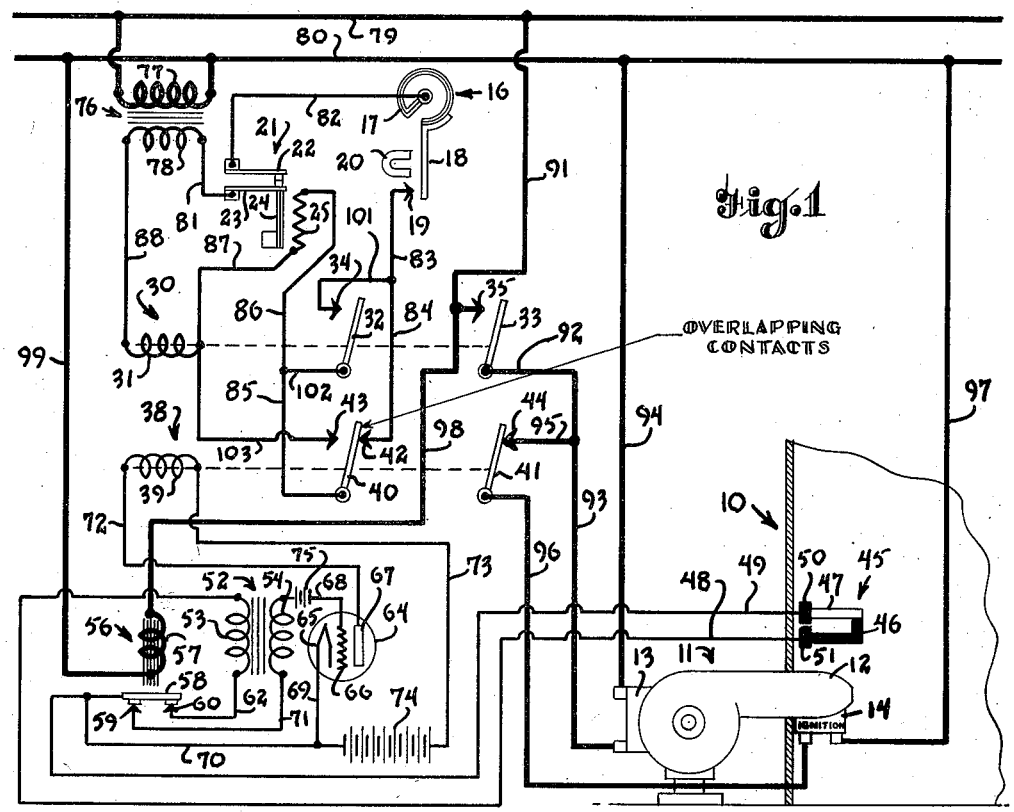
Figure 1 is a view of the improved thermocouple arrangement applied to an oil burner control system.

Referring to the drawing, Figure 1 shows one form of thermocouple arrangement of the present invention applied to an oil burner control circuit. It is to be understood that this application of the invention is merely illustrative and is not the only use for the present invention. Referring to Figure 1, a portion of an oil burning furnace is shown in the drawing and is generally indicated by the reference numeral 10. Extending into the furnace is an oil burner 11 having a nozzle 12 and a motor for forcibly supplying fuel and air to the burner. Only the terminal plate of the motor is shown, this being designated by the reference numeral 13. Associated with the oil burner is an ignition means 14. This ignition means may be of any conventional form, which usually consists of a step-up transformer and a pair of ignition terminals adjacent the outlet of the oil burner nozzle.

A thermostat is used to control the operation of the oil burner and is designated by the reference numeral 16. This thermostat is located in the space whose temperature is to control the operation of the burner and may be of any conventional construction. As shown in the drawing, it consists of a bimetallic element 17 to which is secured a contact arm 18 adapted to engage with a fixed contact 19. Located adjacent the contact arm 18 is a magnet 20 which serves to impart a snap action to the movement of the contact arm 18 and to result in the necessity of a temperature differential for movement of the contact arm into and out of engagement with contact 19. The snap action prevents the formation of an arc between the contact 19 and the contact arm 18 as the contact arm approaches and leaves the contact 19. The function of the magnet in making necessary a temperature differential prevents excessive starting and stopping of the motor due to a chattering of the thermostat as it approaches its contact.

A thermal safety switch is indicated by the reference numeral 21. This safety switch is employed for the purpose of terminating the operation of the oil burner if combustion does not take place within a predetermined period of time. This thermal safety switch may be of any conventional form, one preferable form being that shown in the patent to F. S. Denison No. 1,958,081 issued May 8, 1934. As shown in the drawing, the safety switch comprises a pair of switch blades 22 and 23, the lower of which is pivotally mounted. The lower blade 23 is prevented from moving out of contact engagement with the upper blade 22 by means of bimetallic element 24 which in its cold position extends under the end of switch blade 23. Located in proximity to the bimetal 24 is a heater 25. This heater serves to heat the bimetallic element and warp the upper end thereof towards the right. If this warping action continues sufficiently long, the upper end of the bimetal will move out from under the lower switch blade 23 permitting the same to drop away from switch blade 22.

A relay is generally designated by the reference numeral 30. This relay comprises a relay coil 31 and a pair of switch blades 32 and 33. The switch blades 32 and 33 are adapted to cooperate with fixed contacts 34 and 35. The blades 32 and 33 are normally biased out of engagement with contacts 34 and 35 but are adapted to be moved into engagement therewith by energization of the relay coil 31.

A second relay 38 comprises a relay coil 39 and a pair of switch blades 40 and 41. The switch blade 40 is normally biased into engagement with contact 42 and is moved upon energization of relay coil 39 into engagement with contact 43. Switch blade 40 and contacts 42 and 43 are so designed that switch blade 40 engages contact 43 before it separates from contact 42, as indicated by the legend on the drawing. The switch blade 41 is biased into engagement with contact 44 and is adapted to be moved out of engagement therewith by energization of the relay coil 39.

A thermocouple 45 is located within the furnace 10 within the zone of combustion. This thermocouple consists of a pair of elements 46 and 47 of suitably dissimilar thermoelectric characteristics. The two elements 46 and 47 are joined at their forward end in the normal manner. At their outer end, however, these elements are joined to conductors 48 and 49 through relatively heavy joints 50 and 51. Thus upon a temperature rise, the junction at the forward end heats up more rapidly than the outer junction with the result that this becomes the hot junction of the thermocouple. Upon a temperature fall, the outer end of the thermocouple heats up more rapidly so that this is the hot junction.

A step-up transformer is indicated by the reference numeral 52. This transformer comprises a low voltage primary 53 and a high voltage secondary 54. The conductor 48 is connected to the upper terminal of the primary 53. The conductor 49 is connected to one terminal of a vibrator 56. This vibrator comprises a coil 57 and an armature member 58. The coil 57, as will be more apparent from the subsequent description, is connected to a commercial source of alternating current which alternates at a fixed frequency, usually 60 cycles a second. The armature 58 is accordingly moved to and from the coil 57 one hundred and twenty times a second. The armature 58 is adapted to engage two contacts 59 and 60. Contact 60 is connected through conductor 62 to the lower terminal of primary 53.

A space discharge amplifier which may take the form of a grid controlled vacuum tube is indicated by reference numeral 64. This tube comprises the usual cathode 65, grid 66, and anode 67. The grid 66 is connected through conductor 68 and a grid biasing battery 75 to the upper terminal of the secondary 54. The cathode 65 is connected through conductors 69 and 70 to the armature of vibrator 58 which moves into and out of engagement with contact 59. The contact 59 is connected through conductor 71 with the secondary winding 54. Thus the voltage applied between the grid and cathode is that due to the biasing battery 75 plus or minus the voltage produced across the terminals of secondary 54. The application of this voltage is controlled by the contact 59 and armature 58 of the vibrator 56. The anode 67 of the vacuum tube is connected through conductor 72 to the left-hand terminal of relay coil 39. The other terminal of relay coil 39 is connected through conductor 73 to the positive terminal of a battery 74. The negative terminal of the battery is connected through conductor 69 to the cathode 65. The anode circuit of tube 64 thus includes the battery 74 and the relay 39. The biasing battery 75 is of such value that the resultant plate current, in the absence of a potential across secondary 54, will be sufficient to hold relay 39 in its energized position but will not move it to that position.

A step-down transformer 76 is employed for supplying power for the operation of the system. This transformer comprises a line voltage primary 77 connected to line wires 79 and 80 leading to any suitable source of power (not shown). The transformer also includes a low voltage secondary winding 78.

*Operation of Figure 1 species*

The various elements of the system are shown in the position which they assume when the temperature to which thermostat 16 is subjected is at or slightly above the desired temperature. As the temperature falls, the contact arm 18 is moved to the left. If this temperature fall continues sufficiently far, contact arm 18 will be moved into engagement with contact 19. When this occurs, the following circuit will be established to relay coil 31: from the right-hand terminal of secondary 78 through conductor 81, switch blades 23 and 22, conductor 82, bimetallic element 17, contact blade 18, contact 19, conductors 83 and 84, contact 42, switch blade 40, conductors 85 and 86, heating element 25, conductor 87, relay coil 31, and conductor 88 to the other terminal of secondary 78. The establishment of the above traced energizing circuit to relay coil 31 causes this coil to be energized and causes switch blades 32 and 33 to be moved into engagement with contacts 34 and 35.

The movement of switch blade 33 into engagement with contact 35 results in the following circuit being established to the oil burner motor 13: from line wire 79 through conductor 91, contact 35, switch blade 33, conductors 92 and 93, burner motor 13 and conductor 94 to the other line wire 80. At the same time, the following circuit is established to the ignition means 14: from line wire 79 through conductor 91, contact 35, switch blade 33, conductors 92 and 95, contact 44, switch blade 41, conductor 96, ignition means 14, and conductor 97.

The establishment of the above traced energizing circuits to the oil burner motor and to the ignition means results in the establishment of the conditions necessary for combustion to take place. Under normal conditions, combustion will be almost immediately established as a result of the ignition of the oil issuing from the burner nozzle. The result is that the temperature within the combustion chamber will rise very rapidly causing the inner junction between thermocouple members 46 and 47 to become very much hotter than the outer junction. The result of this is that an electromotive force is generated between the thermocouples in one direction. The vibrator coil 56 is connected to the line wires 78 and 79 by the following energizing circuit: from line wire 79 through conductor 91, conductor 98, vibrator coil 57, and conductor 99 to the other line wire 80. By reason of this circuit, the vibrator 56 is constantly operated. As soon as the electromotive force is generated by the thermocouple 45 in the manner previously described, the periodic interruption of the circuit between the thermocouple and the primary 53 by reason of the periodic separation of armature 58 from contact 60 will cause a pulsating current to flow through primary 53. This pulsating current results in an alternating voltage being generated in the secondary winding. If this alternating voltage was applied to the tube 64, the resulting output current would have an alternating component and the particular direction in which the current flowed through the thermocouple 45 would have no effect upon the value of the average value of the output current. By reason, however, of the inclusion of the armature 58 and the contact 59 in the connections between the secondary 54 and the grid and cathode of the vacuum tube 65, the input circuit to the vacuum tube is interrupted each time that the circuit to the primary is interrupted. This makes it possible to impress only the positive peaks or only the negative peaks of the alternating voltage of secondary 54 upon the grid 66. The apparatus is so designed and connected that when the inner junction of thermocouple 45 is the hot junction, only the positive peaks will be impressed upon the grid. When this occurs, a very large output current flows through the tube which results in a rather large current flowing through the relay 39. The effect of this is to cause the energization of relay coil 39 and the resultant movement of switch blades 40 and 41 out of engagement with contacts 42 and 44. Before the blade 40 separates from contact 42, however, it moves into engagement with contact 43. The separation of switch blade 41 from contact 44 opens the previously traced circuit to the ignition means resulting in the deenergization of the ignition means which is no longer needed in view of the establishment of combustion. The movement of switch blade 40 into engagement with contact 43 results in the establishment of the following holding circuit to relay coil 31: from the right-hand terminal of secondary 78 through conductor 81, switch blades 23 and 22, conductor 82, bimetallic element 17, contact blade 18, contact 19, conductors 83 and 101, contact 34, switch blade 32, conductors 102 and 85, switch blade 40, contact 43, conductor 103, relay coil 31, and conductor 88 to the other terminal of secondary 78. It will be noted that this new holding circuit is independent of the heating element 25, being parallel thereto. After this circuit is established by the engagement of switch blade 40 with contact 43, the switch blade moves out of engagement with contact 42 thus interrupting the previously traced circuit through heating element 25. The establishment of the holding circuit terminates the heating of the thermal safety switch and thus insures that the oil burner will continue in operation.

After the combustion has proceeded for a short time, the temperature of the two junctions of the thermocouple will be substantially the same with the result that no voltage is generated by the thermocouple. The grid 66 under these circumstances will be at the potential maintained by biasing battery 75. As previously explained, the bias produced by battery 75 is of such a value as to maintain a flow of current through the relay coil 39 sufficient to retain the switch blades 40 and 41 in their energized positions, although this flow of current is insufficient to move the blades to their energized position. Thus so long as combustion is maintained, the relay 38 will remain energized.

Under normal conditions, the burner will continue in operation until thermostat 16 is satisfied, at which time contact arm 18 is moved out of engagement with contact 19 with the result that relay 31 is deenergized terminating the operation of the oil burner. The resulting cooling of the combustion chamber will cause the junctions 50 and 51 to become the hot junctions of the thermocouple so that the current will flow through the primary winding 53 in the opposite direction to that previously discussed. The result of this is that only the negative peaks of the voltage generated by secondary 54 are applied to the grid of the tube 64. These negative peaks result in the negative bias of grid 66 being increased to the point where current no longer flows in the output circuit of tube 64. The result is that relay coil 39 is deenergized and the switch blades 40 and 41 assume the position shown in the drawing.

The operation which has just been described is that which occurs under normal circumstances. If after the conditions necessary for combustion are established combustion does not take place, relay coil 39 is never pulled in with the result that heating element 25 eventually warps bimetallic element 24 to the right sufficiently far to permit separation of switch blades 22 and 23. After this occurs, it is impossible to restart the burner until the safety switch 21 is reset manually.

It sometimes occurs that combustion is properly started but for some reason or other is interrupted while the thermostat is still calling for heat. Under these conditions, the temperature of the combustion chamber begins to drop causing the junctions 50 and 51 to be the hot junctions of the thermocouple. The effect of this is the same as previously described. In other words, the negative bias on grid 66 is increased to the point where no current flows through relay coil 39 and the relay 38 drops out. As soon as the relay does drop out, switch blade 40 is reengaged with contact 42 to again cause heating element 25 to be energized. At the same time, switch blade 41 is moved into engagement with contact 44 to effect reenergization of the ignition means 14. If the condition producing the combustion failure is a temporary one, combustion can be reestablished by reason of the reenergization of the ignition means. If not, the system will be deenergized in the manner previously described by reason of the continued heating of the heating element 25 of the safety switch 21.

It will be seen that with the improved thermocouple apparatus of the present invention it is possible to couple a thermocouple to a vacuum tube having sufficient output for the operation of the control apparatus without any intermediate steps of amplification. Moreover, it will be seen that the present apparatus makes possible the use of a thermocouple in which the current is reversed depending upon the direction of the temperature change. Moreover, this is accomplished with an extremely simple arrangement.

Figure 2 species

Figure 2:
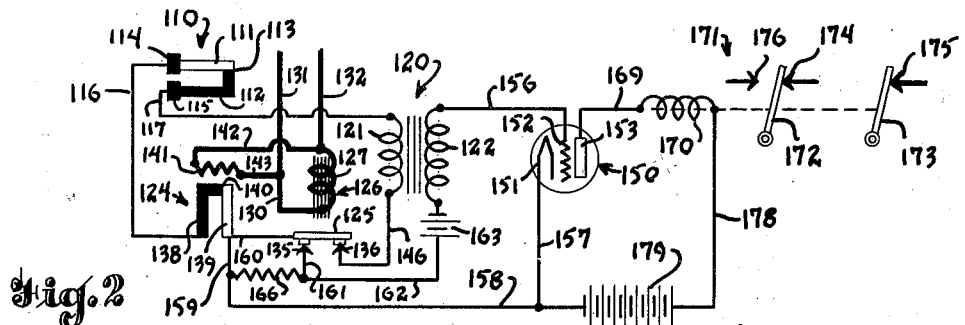
Figure 2 is a modification thereof.

In Figure 2, a modification of the thermocouple apparatus of the present invention is shown. In this figure, only the thermocouple and its associated apparatus has been shown although it is to be understood that this apparatus is adapted to be employed in a system such as shown in Figure 1.

Referring to Figure 2, a thermocouple is generally indicated by the reference numeral 110. This thermocouple consists of two elements 111 and 112 of suitably dissimilar thermoelectric characteristics. The elements are joined at 113 by means of a joint of relatively small thermal capacity. At 114 and 115 the elements 111 and 112 are joined to conductors 116 and 117, respectively by means of joints of relatively high heat capacity.

A step-up transformer is indicated by the reference numeral 120. This transformer comprises a low voltage primary 121 and a high voltage secondary 122. The conductor 117 is connected to the upper terminal of the primary 121. The conductor 116 is connected through a second thermocouple 124 to the armature 125 of a vibrator 126. The vibrator 126 is similar in construction to that of the preferred species and comprises in addition to the armature 125 a coil 127 which is energized by a commercial alternating current source of power through conductors 130, 131, and 132. The armature 125 is adapted to be moved into and out of engagement with contacts 135 and 136. The thermocouple 124 is so connected as to aid the thermocouple 110 when the junction 113 of thermocouple 110 is the hot junction. The thermocouple 124 comprises two elements 138 and 139 of suitably dissimilar thermoelectric characteristics. These two elements are joined at 140 to provide a hot junction. Associated with the thermocouple adjacent to the hot junction 140 is an electrical heating element 141 which is connected by means of conductors 142 and 143 to the wires 131 and 132 leading to the source of power. The contact 136 of the vibrator 126 is connected through conductor 146 to the primary winding 121.

A space discharge amplifier which may preferably take the form of a grid controlled vacuum tube is indicated by the reference numeral 150. This tube comprises a cathode 151, a grid 152, and an anode 153. The grid 152 is connected through conductor 156 to one terminal of the secondary 122. The cathode 151 is connected through conductors 157, 158, 159, and 160 to the armature 125. The contact 135 which cooperates with this armature is connected through conductors 161 and 162 and battery 163 with the other terminal of secondary 122. Thus the grid and cathode are periodically connected by the vibrator in series with the biasing battery 163 and the secondary 122. The biasing battery 122 is connected with its positive terminal to the cathode so that the effect of this battery is to bias the grid negatively. The value of this battery is such that when the voltage due to this battery is the only voltage impressed upon the grid, the grid is biased negatively so far as to prevent flow of current in the plate circuit. In addition to the previously traced grid circuit, which is controlled by the vibrator 126, there is a permanent grid circuit as follows: from the cathode 151 through conductors 157 and 158, resistor 166, conductor 162, battery 163, secondary 122, and conductor 156 to the grid 152. This circuit serves in the absence of any other connections between the grid and the cathode to bias the grid negatively by the voltage of battery 163, this voltage as previously explained, being sufficient to prevent plate current from flowing.

The anode 153 is connected by conductor 169 with a relay coil 170 of a relay 171. This relay may correspond to the relay 38 of the Figure 1 species. Thus the relay is shown as actuating two switch blades 172 and 173 which are biased into engagement with contacts 174 and 175. The blade 172 is adapted to be moved into engagement with a contact 176 upon energization of the relay coil 170. The other terminal of the relay coil 170 is connected through a conductor 178 with the positive terminal of a battery 179. The negative terminal of the battery is connected through conductor 157 to the cathode 151.

The battery 163 biases the grid negatively sufficiently that the voltage produced by the thermocouple 113 even when increased by the transformer 120 would not be sufficient to overcome the biasing effect of battery 163 sufficiently to cause the tube to pass enough current to energize relay 170. Consequently, in order to partially overcome the effect of battery 163, the thermocouple 124 is provided. This thermocouple by reason of being electrically heated at its hot junction furnishes a source of constant voltage which acts in a manner to oppose the effect of battery 163. The thermocouple 124 could, if desired, be replaced by any other source of voltage which is sufficiently constant. The voltage produced by thermocouple 124 results normally in battery 163 having no more effect than the biasing battery 75 of the preferred species. In other words, the combined effects of battery 163 and thermocouple 124 results in the grid being biased sufficiently negative that there is still current flow in the plate circuit but that the voltage generated by the thermocouple 110 when it is in such a direction that the negative peaks are impressed upon the grid circuit will carry the tube to or close to cut-off, i. e., the point at which no current flows in the plate circuit. Thus so long as the vibrator is working properly, the operation is substantially the same as in the Figure 1 species with the exception that there is always a constant voltage in one direction produced by the thermocouple 124, which voltage overcomes in part the effect of battery 163. As soon, however, as the vibrator ceases to function properly so that the armature 125 no longer makes or breaks the contacts 136, the effect of the thermocouple 124 is no longer felt in the secondary circuit, since in order for this constant voltage to have any effect on the secondary circuit it is necessary for it to be periodically interrupted. Thus the only voltage impressed upon the grid is that due to battery 163 and the grid becomes biased sufficiently negatively that no current flows in the plate circuit. It will be noted that this action occurs regardless of whether the armature 125 sticks in the open position or in the closed position. If the armature sticks in the closed position, the voltage produced by thermocouple 124 has no effect as previously explained. In this case, the circuit between the grid and the cathode is completed through contact 135, armature 125, conductor 160, and conductor 159. When the armature sticks in the open position then the circuit is completed through resistor 166. The resistor 166 is selected with a sufficiently high impedance that ordinarily it has little effect upon the circuit if the armature is operating properly. In other words, it offers a sufficiently high impedance that the armature 125 cooperating with contact 135 still rectifies the grid voltage. As soon as the static condition is produced, however, the resistor 166 serves to bring the grid to the potential of battery 163 with respect to the cathode 151.

Thus it will be noted that assurance is made if the vibrator does not properly work that the apparatus will go to a safe position. This is highly desirable particularly in the temperature control art where it is imperative that safety apparatus never indicate a safe condition when such safe condition may not in fact exist.

Figure 3:
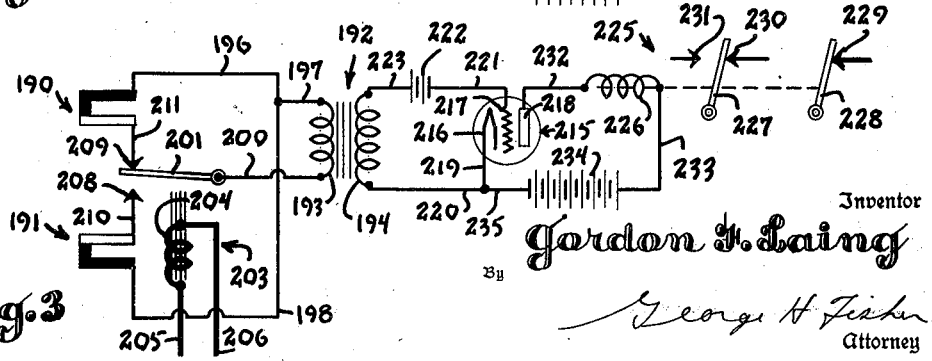
Figure 3 is a third form of thermocouple arrangement.

*Figure 3 species*

In Figure 3, a further arrangement is shown in which the secondary circuit is not rectified as in the preceding circuits but in which two thermocouples are employed. The use of a single thermocouple in conjunction with a vibrator means that for a half of each cycle no current flows in the primary circuit. By the use of two thermocouples oppositely disposed, this condition is overcome and a very much higher amplitude is obtained in the input circuit. Moreover, the difficulty of sparking at the vibrator contacts is eliminated in large measure.

Referring to Figure 3, it will be noted that there are two thermocouples designated by the reference numerals 190 and 191. These thermocouples are of conventional construction and need no further description.

The step-up transformer is indicated by the reference numeral 192. This transformer comprises a low voltage primary 193 and a high voltage secondary 194. One terminal of thermocouple 190 is connected through conductors 196 and 197 to the primary 193. Similarly, one terminal of thermocouple 191 is connected through conductors 198 and 197 with the same terminal of primary 193. The other terminal of the primary is connected by a conductor 200 to the movable armature switch blade 201 of vibrator 203. This vibrator comprises in addition to the armature switch blade 201 a vibrator coil 204. This vibrator coil is connected through conductors 205 and 206 to a suitable source of power (not shown). The vibrator blade 201 is adapted to move alternately into engagement with contacts 208 and 209. The adjacent terminals of thermocouples 190 and 191 are connected by conductors 210 and 211 to contacts 208 and 209, respectively.

A space discharge amplifier is indicated by the reference numerals 215. This amplifier may be of any conventional form such as an ordinary grid control vacuum tube. The amplifier is shown as comprising the usual cathode 216, the grid 217, and the anode 218. The cathode is connected by conductors 219 and 220 to the lower terminal of secondary 194. The grid is connected through conductor 221, battery 222, and conductor 223 to the other terminal of secondary 194. Battery 222 is for the purpose of biasing the grid sufficiently negative that the tube passes current only when the positive peaks of the pulsating voltage produced through the cooperative action of thermocouples 190 and 191 and transformer 192 are impressed on the grid. In other words, the battery 222 causes the tube to operate as a class B amplifier.

A relay 225 is operated by the output tube 215. This relay comprises a relay coil 226 and a plurality of switch blades 227 and 228 which selectively cooperate with contacts 229, 230, and 231. It is to be understood that any desired arrangement of contacts and switch blades may be used. The anode 218 is connected to one terminal of the relay coil 226 through a conductor 232. The other terminal of the relay coil 226 is connected through a conductor 233 to the positive terminal of a battery 234. The negative terminal of the battery 234 is connected through conductors 235 and 219 to the cathode 216. The battery 234 performs the usual function of impressing a voltage between the anode and the cathode.

When the vibrator blade 201 is in the position shown in the drawing in engagement with contact 209, the output of thermocouple 190 flows through the secondary 193. When the vibrator blade moves down to contact 208, the current from thermocouple 190 to the primary 193 is interrupted and current flow in the same direction from thermocouple 191 through primary 193 results. Thus with the use of the two thermocouples a series of impulses in the same direction flows through the primary 193. The result is that there are no half cycles in which no current flows as in the case where only one thermocouple is used. The result is that a very much larger secondary current is produced and consequently a vacuum tube of much larger output may be used. The arrangement of Figure 3 is, moreover, relatively free from sparking inasmuch as almost immediately after the blade 201 leaves the contact 209 it is moved into engagement with contact 208 whereupon a connection is made which is in effect parallel with the air gap between blade 201 and the contact 209. Thus the voltage which should ordinarily cause a current to flow across this air gap is absorbed in the circuit formed by the closure of blade 201 with contact 203. A similar action occurs upon a reverse movement of blade 201. Thus the difficulty previously encountered with devices of this type due to sparking is to a large extent eliminated.

It will be seen that I have provided a new and novel thermocouple device which eliminates the objections of the prior art devices in an extremely simple and effective manner. While I have shown certain specific embodiments of my invention for purposes of illustration, it is to be understood that the invention is limited only by the scope of the appended claims.

I claim as my invention:

1. In combination, a thermocouple having one junction capable of readily absorbing and giving up heat and a second junction capable of only slowly absorbing and giving up heat, apparatus to be operated in accordance with the direction of temperature change, a step-up transformer comprising primary and secondary windings, means for controlling said apparatus in accordance with the voltage across said secondary winding, circuit connections between said thermocouple and the primary of said transformer, and means for periodically interrupting said circuit connections and for simultaneously interrupting the circuit of said secondary winding.

2. In combination, a thermocouple having one junction capable of readily absorbing and giving up heat and a second junction capable of only slowly absorbing and giving up heat, apparatus to be operated in accordance with the direction of temperature change, a step-up transformer comprising primary and secondary windings, means for controlling said apparatus in accordance with the voltage across said secondary winding, circuit connections between said thermocouple and the primary of said transformer, and means for periodically interrupting said circuit connections and for rectifying the output of said secondary winding.

3. In combination, a thermocouple having one junction capable of readily absorbing and giving up heat and a second junction capable of only slowly absorbing and giving up heat, apparatus to be operated in accordance with the direction of temperature change, a space discharge amplifier, a step-up transformer comprising primary and secondary windings, means for controlling said apparatus in accordance with the output of said amplifier, an input circuit for said amplifier, means including said secondary winding for impressing a voltage on said input circuit, circuit connections between said thermocouple and the primary of said transformer, and means for periodically interrupting said circuit connections between said thermocouple and said primary winding and for simultaneously interrupting the circuit of said secondary winding.

4. In combination, a thermocouple having one junction capable of readily absorbing and giving up heat and a second junction capable of only slowly absorbing and giving up heat, apparatus to be operated in accordance with the direction of temperature change, a step-up transformer comprising primary and secondary windings, means for controlling said apparatus in accordance with the voltage across said secondary winding, circuit connections between said thermocouple and the primary of said transformer, a vibrator for simultaneously and periodically interrupting the circuit connections between the thermocouple and the primary of the transformer and the circuit of said secondary winding.

5. In combination, a thermocouple having one junction capable of readily absorbing and giving up heat and a second junction capable of only slowly absorbing and giving up heat, apparatus to be operated in accordance with the direction of temperature change, a space discharge amplifier, a step-up transformer comprising primary and secondary windings, means for controlling said apparatus in accordance with the output of said amplifier, an input circuit for said amplifier, means including said secondary winding for impressing a voltage on said input circuit, circuit connections between said thermocouple and the primary of said transformer, means for periodically interrupting said circuit connections between said thermocouple and said primary winding and for simultaneously interrupting the circuit of said secondary winding, and biasing means effective when said interrupting means is operative to cause said amplifier to have an appreciable output current even when no potential is generated by the thermocouple, said biasing means being effective in the event of a failure of said interrupting means to apply a voltage to the input circuit of said amplifier such that no current flows in the output circuit thereof.

6. In combination, a thermocouple, apparatus to be operated in accordance with the temperature to which said thermocouple is subjected, a space discharge amplifier, a step-up transformer comprising primary and secondary windings, means for controlling said apparatus in accordance with the output of said amplifier, an input circuit for said amplifier, means including said secondary winding for impressing a voltage on said input circuit, circuit connections between said thermocouple and the primary of said transformer, means for periodically interrupting said circuit connections between said thermocouple and said primary winding and for simultaneously interrupting the circuit of said secondary winding, and biasing means effective when said interrupting means is operative to cause said amplifier to have an appreciable output current even when no potential is generated by the thermocouple, said biasing means being effective in the event of a failure of said interrupting means to apply a voltage to the input circuit of said amplifier such that no current flows in the output circuit thereof.

7. In combination, a grid controlled space discharge amplifier, a source of relatively small direct current control voltage, a step-up transformer having a primary and a secondary, interrupting means for periodically making and breaking a circuit, a connection between the secondary of said transformer and the grid circuit of said amplifier, means associated with said grid circuit and tending to bias the grid to the cut-off voltage of the amplifier, means connecting said source of direct current control voltage to the primary of said transformer through said interrupting means, and further biasing means connected to the primary of said transformer through said interrupting means and of such polarity and magnitude that when amplified through the cooperative action of said interrupting means and said transformer, it overcomes the biasing voltage in the grid circuit sufficiently to enable the relatively small control voltage to control the operation of the amplifier, whereby the biasing voltage in the grid circuit is able to cause the grid bias to assume the cut-off voltage only upon failure of said interrupter.

8. In combination, a grid controlled space discharge amplifier, a thermocouple, a step-up transformer having a primary and a secondary, interrupting means for periodically making and breaking a circuit, a connection between the secondary of said transformer and the grid circuit of said amplifier, means associated with said grid circuit and tending to bias the grid to the cut-off voltage of the amplifier, means connecting said thermocouple to the primary of said transformer through said interrupting means, and further biasing means connected to the primary of said transformer through said interrupting means and of such polarity and magnitude that when amplified through the cooperative action of said interrupting means and said transformer, it overcomes the biasing voltage in the grid circuit sufficiently to enable the thermocouple to control the operation of the amplifier, whereby the biasing voltage in the grid circuit is able to cause the grid bias to assume the cut-off voltage only upon failure of said interrupter.

9. In combination, a thermocouple having one junction capable of readily absorbing and giving up heat and a second junction capable of only slowly absorbing and giving up heat, electromagnetic apparatus movable between energized and deenergized positions, a space discharge amplifier, a step-up transformer comprising primary and secondary windings, means for controlling the energization of said electromagnetic apparatus in accordance with the output of said amplifier, an input circuit for said amplifier, means including said secondary winding and a biasing voltage for impressing a voltage on said input circuit, circuit connections between said thermocouple and the primary of said transformer, and means for periodically interrupting said circuit connections between said thermocouple and said primary winding and for simultaneously interrupting the circuit of said secondary winding, the value of said biasing voltage being such that when said thermocouple is generating no voltage the output current of said space discharge device is sufficient to cause said electromagnetic apparatus to be held in energized position but insufficient to cause said apparatus to move to energized position.

GORDON F. LAING.